(12) United States Patent
Jones et al.

(10) Patent No.: US 7,346,072 B2
(45) Date of Patent: *Mar. 18, 2008

(54) ARBITRATION MECHANISM FOR PACKET TRANSMISSION

(75) Inventors: Andrew M. Jones, Redland (GB); John A. Carey, Bishopston (GB)

(73) Assignee: STMicroelectronics Ltd. (GB)

( * ) Notice: Subject to any disclaimer, the term of this patent is extended or adjusted under 35 U.S.C. 154(b) by 381 days.

This patent is subject to a terminal disclaimer.

(21) Appl. No.: 10/780,355

(22) Filed: Feb. 17, 2004

(65) Prior Publication Data

US 2004/0160978 A1    Aug. 19, 2004

Related U.S. Application Data

(63) Continuation of application No. 09/411,429, filed on Oct. 1, 1999, now Pat. No. 6,693,914.

(51) Int. Cl.
*H04L 12/43* (2006.01)

(52) U.S. Cl. .............. 370/461; 370/235; 370/401; 370/447

(58) Field of Classification Search .............. None
See application file for complete search history.

(56) References Cited

U.S. PATENT DOCUMENTS

| | | | |
|---|---|---|---|
| 4,814,981 A | 3/1989 | Rubinfeld | |
| 5,251,311 A | 10/1993 | Kasai | |
| 5,359,592 A * | 10/1994 | Corbalis et al. ............ | 370/233 |
| 5,386,565 A | 1/1995 | Tanaka et al. | |
| 5,402,416 A | 3/1995 | Cieslak et al. | |
| 5,423,050 A | 6/1995 | Taylor et al. | |
| 5,434,804 A | 7/1995 | Bock et al. | |
| 5,440,705 A | 8/1995 | Wang et al. | |
| 5,448,576 A | 9/1995 | Russell | |
| 5,452,432 A | 9/1995 | Macachor | |
| 5,455,936 A | 10/1995 | Maemura | |
| 5,479,652 A | 12/1995 | Dreyer et al. | |
| 5,483,518 A | 1/1996 | Whetsel | |
| 5,488,688 A | 1/1996 | Gonzales et al. | |
| 5,530,965 A | 6/1996 | Kawasaki et al. | |

(Continued)

FOREIGN PATENT DOCUMENTS

EP    0165600 B1    11/1991

(Continued)

OTHER PUBLICATIONS

York, Richard, Real Time Debug for System-on-Chip Devices, Jun. 1999, pp. 1-6.

*Primary Examiner*—Duc Ho
(74) *Attorney, Agent, or Firm*—Lisa K. Jorgenson; William J. Kubida

(57) ABSTRACT

A pipelined arbitration mechanism allows a routing control decision to be effected for a later packet while a current packet is being transferred. The later packet can be issued a fixed number of cycles after the current request. The mechanism has particular advantages when used with a plurality of functional modules connected to a packet router, whereby a single functional module can generate a current request relating to a current packet and a deferred arbitration request relating to a later packet to be issued a fixed number of cycles after the current request.

20 Claims, 4 Drawing Sheets

U.S. PATENT DOCUMENTS

| | | |
|---|---|---|
| 5,570,375 A | 10/1996 | Tsai et al. |
| 5,590,354 A | 12/1996 | Klapproth et al. |
| 5,596,734 A | 1/1997 | Ferra |
| 5,598,551 A | 1/1997 | Barajas et al. |
| 5,608,881 A | 3/1997 | Masumura et al. |
| 5,613,153 A | 3/1997 | Arimilli et al. |
| 5,627,842 A | 5/1997 | Brown et al. |
| 5,640,518 A | 6/1997 | Muhich et al. |
| 5,657,273 A | 8/1997 | Ayukawa et al. |
| 5,682,545 A | 10/1997 | Kawasaki et al. |
| 5,704,034 A | 12/1997 | Circello |
| 5,708,773 A | 1/1998 | Jeppesen, III et al. |
| 5,724,549 A | 3/1998 | Selgas et al. |
| 5,737,516 A | 4/1998 | Circello et al. |
| 5,751,621 A | 5/1998 | Arakawa |
| 5,768,152 A | 6/1998 | Battaline et al. |
| 5,771,240 A | 6/1998 | Tobin et al. |
| 5,774,701 A | 6/1998 | Matsui et al. |
| 5,778,237 A | 7/1998 | Yamamoto et al. |
| 5,781,558 A | 7/1998 | Inglis et al. |
| 5,796,978 A | 8/1998 | Yoshioka et al. |
| 5,828,825 A | 10/1998 | Eskandari et al. |
| 5,832,248 A | 11/1998 | Kishi et al. |
| 5,835,963 A | 11/1998 | Yoshioka et al. |
| 5,848,247 A | 12/1998 | Matsui et al. |
| 5,860,127 A | 1/1999 | Shimazaki et al. |
| 5,862,387 A | 1/1999 | Songer et al. |
| 5,867,726 A | 2/1999 | Ohsuga et al. |
| 5,884,092 A | 3/1999 | Kiuchi et al. |
| 5,896,550 A | 4/1999 | Wehunt et al. |
| 5,918,045 A | 6/1999 | Nishii et al. |
| 5,930,523 A | 7/1999 | Kawasaki et al. |
| 5,930,833 A | 7/1999 | Yoshioka et al. |
| 5,944,841 A | 8/1999 | Christie |
| 5,950,012 A | 9/1999 | Shiell et al. |
| 5,953,538 A | 9/1999 | Duncan et al. |
| 5,956,477 A | 9/1999 | Ranson et al. |
| 5,978,874 A | 11/1999 | Singhal et al. |
| 5,978,902 A | 11/1999 | Mann |
| 5,983,017 A | 11/1999 | Kemp et al. |
| 5,983,379 A | 11/1999 | Warren |
| 6,282,195 B1 | 8/2001 | Miller et al. |
| 6,424,658 B1 | 7/2002 | Mathur |
| 6,483,846 B1 * | 11/2002 | Huang et al. ............... 370/445 |
| 6,674,750 B1 * | 1/2004 | Castellano ................. 370/354 |
| 6,904,043 B1 * | 6/2005 | Merchant et al. ........... 370/402 |

FOREIGN PATENT DOCUMENTS

| | | |
|---|---|---|
| EP | 0 539 076 A1 | 4/1993 |
| EP | 0 550 223 A2 | 7/1993 |
| EP | 0636976 B1 | 2/1995 |
| EP | 0636978 A1 | 2/1995 |
| EP | 0652516 A1 | 6/1995 |
| EP | 0702239 A2 | 3/1996 |
| EP | 0720092 A1 | 7/1996 |
| EP | 0933926 A1 | 8/1999 |
| EP | 0945805 A1 | 9/1999 |
| EP | 0959411 A1 | 11/1999 |
| JP | PCT/JP96/02819 | 9/1996 |
| JP | 8320796 A | 12/1996 |
| JP | 8329687 A | 12/1996 |
| JP | 9212358 A | 8/1997 |
| JP | 9311786 A | 12/1997 |
| JP | 10106269 A | 4/1998 |
| JP | 10124484 A | 5/1998 |
| JP | 10177520 A | 6/1998 |

* cited by examiner

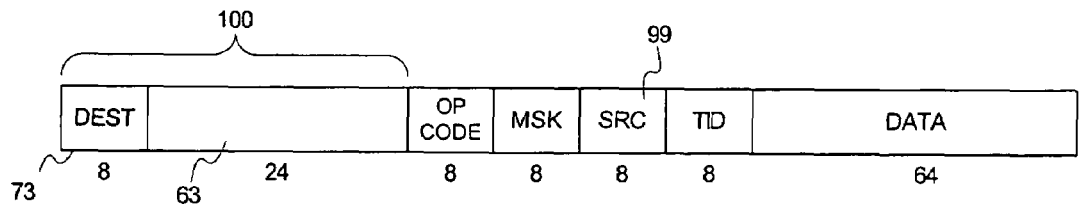
FIGURE 4
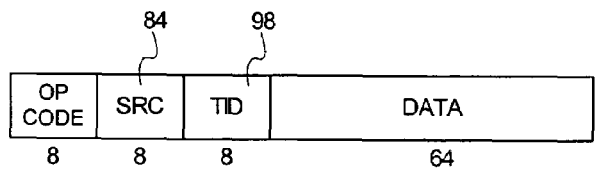
FIGURE 5
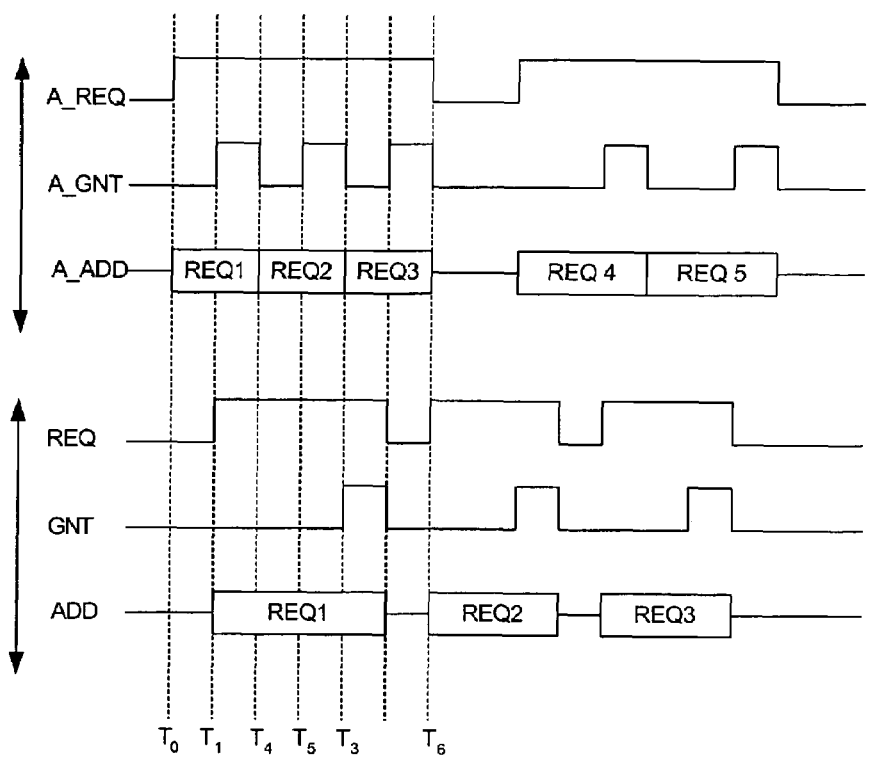
FIGURE 7b
FIGURE 7a

ARBITRATION MECHANISM FOR PACKET TRANSMISSION

RELATED APPLICATIONS

The present application is a continuation of U.S. patent application Ser. No. 09/411,429 entitled ARBITRATION MECHANISM FOR PACKET TRANSMISSION filed on Oct. 1, 1999 now U.S. Pat. No. 6,693,914.

FIELD OF THE INVENTION

The present invention relates to an arbitration mechanism for packet transmission and is particularly but not exclusively concerned with packet transmission in a packet transmission network.

BACKGROUND TO THE INVENTION

Computer systems and integrated circuit processors exist which implement transactions with the dispatch and receipts of packets. Request packets define an operation to be performed and response packets indicate that a request has been received. The integrated circuit processor can comprise a plurality of functional modules connected to a packet router for transmitting and receiving the request and response packets. In such a system, it is necessary to arbitrate between requests received from the functional modules for controlling the flow of packets on the packet router (whether request or response packets). Typically, multiple functional modules are able to access the same bus or the same part of the system which leads to competition for that bus or for the same destination or target modules. The complexity of the arbitration mechanism is a function of the number of devices in the system and the arbitration algorithm which is used.

As the size and clock frequency of such systems, in particular integrated systems, increases, and the complexity of the arbitration function increases, the time required to make an arbitration decision for accesses to resources such as the system bus or target modules becomes critical. In many systems, it is not possible to make an arbitration decision and effect a packet transfer in a single clock cycle. This leads to a drop in potential performance as gaps are inserted increasing the latency between a request for packet transfer being made and the packet transfer actually being implemented.

It is an aim of the present invention to reduce the impact of arbitration decision latency on a system.

SUMMARY OF THE INVENTION

According to one aspect of the present invention there is provided a computer system comprising: a plurality of functional modules interconnected via a packet router, each functional module having packet handling circuitry for generating and receiving packets conveyed by the packet router; and a routing control mechanism for controlling the flow of packets on the packet router, said routing control mechanism being connected to said functional modules and to said packet router, wherein each functional module is operable to generate to the routing control mechanism a transfer request to request transfer of a current packet and an arbitration request with a destination indicator identifying a destination of a later packet and wherein the routing control mechanism is operable to accept said arbitration request with the destination indicator of the later packet and to effect a routing decision relating to the arbitration request while implementing the transfer of the current packet requested by the transfer request.

In the described embodiment, the arbitration request relates to a packet issued two cycles after the current packet by the same functional module. That is, the arbitration unit effectively hides a latency of two decision cycles. However, a latency period of at least one cycle still represents a considerable advantage. That is, transfer of a current packet can be implemented while a subsequent arbitration decision is effected. There can be any suitable number of cycles in the latency period.

At least a set of said functional modules can act as initiator modules for generating request packets for implementing transactions, each request packet including the destination indicator. A further set of the functional modules can act as target modules for receiving said request packets and for issuing respective response packets. The response packets can be arbitrated in the same way as request packets with associated response transfer and response arbitration request signals. Each functional module can be operable to generate a grant signal indicating that it is in a state to receive a packet. That grant signal is used by the routing control mechanism to effect packet transfers.

The routing control mechanism is preferably operable to issue an arbitration grant signal indicating that it has committed an arbitration decision to await transfer. This acts as a handshake mechanism to indicate to the functional modules that an arbitration request has been granted and the system is committed to transferring that packet. This allows the functional module to begin negotiation for an arbitration decision for a subsequent packet, possibly before the transfer of the previous packet.

In the preferred embodiment, each packet has an address field identifying a destination module using the destination indicator and identifying an address location within the target module to which the packet is to be directed. The arbitration request is associated with the destination indicator to allow arbitration decisions to be made while the transfer request is associated with the location within the target module.

Another aspect of the invention provides a functional module for connection to a packet router and having packet handling circuitry for generating and receiving packets conveyed by the packet router, the functional module being operable to generate packet flow control signals including a transfer request requesting transfer of a current packet and an arbitration request signal with a destination indicator identifying a destination of a later packet, wherein the arbitration request signal is issued when the later packet is ready for transfer.

Another aspect of the invention provides a routing control mechanism for routing packets between a plurality of functional modules interconnected via a packet router, the routing mechanism comprising: an arbitration mechanism for effecting routing decisions for each packet for which a request signal is received; a decision queue for holding at least one decision which has been made by the arbitration mechanism; and a transfer mechanism for transferring packets relating to queued decisions to the packet router to implement a packet transfer, wherein the arbitration mechanism is operable to effect a routing decision for a later packet while a current packet is being transferred by the transfer mechanism onto the packet router.

Another aspect of the invention provides a plurality of functional modules interconnected via a packet router, each functional module having packet handling circuitry for generating and receiving packets conveyed by the packet router; and a routing control mechanism for controlling the flow of packets on the packet router, said routing control mechanism being connected to said functional modules and to said packet router, the routing control mechanism comprising: an arbitration mechanism for effecting routing decisions for each packet for which a request signal is received; a queue for holding at least one routing decision which has been made by the arbitration mechanism; and a transfer mechanism for transferring packets relating to queued decisions to the packet router to implement a packet transfer, wherein the arbitration mechanism is operable to effect a routing decision for a later packet while a current packet is being transferred by the transfer mechanism onto the packet router.

Another aspect of the invention provides a method of effecting pipelined routing decisions in an integrated circuit comprising a plurality of functional modules interconnected via a packet router wherein each functional module generates a transfer request for a current packet and an arbitration request with a destination indicator of a later packet, the method comprising: effecting a transfer of the current packet based on an earlier routing control decision while making a routing control decision in relation to the later packet.

For a better understanding of the present invention and to show how the same may be carried into effect reference will now be made by way of example to the accompanying drawings.

BRIEF DESCRIPTION OF THE DRAWINGS

FIGS. 4 and 5 illustrate the format of packets routed by the packet router;

FIGS. 7a and 7b are timing diagrams illustrating operation of the arbitration unit.

DESCRIPTION OF THE PREFERRED EMBODIMENT

Figure 1:
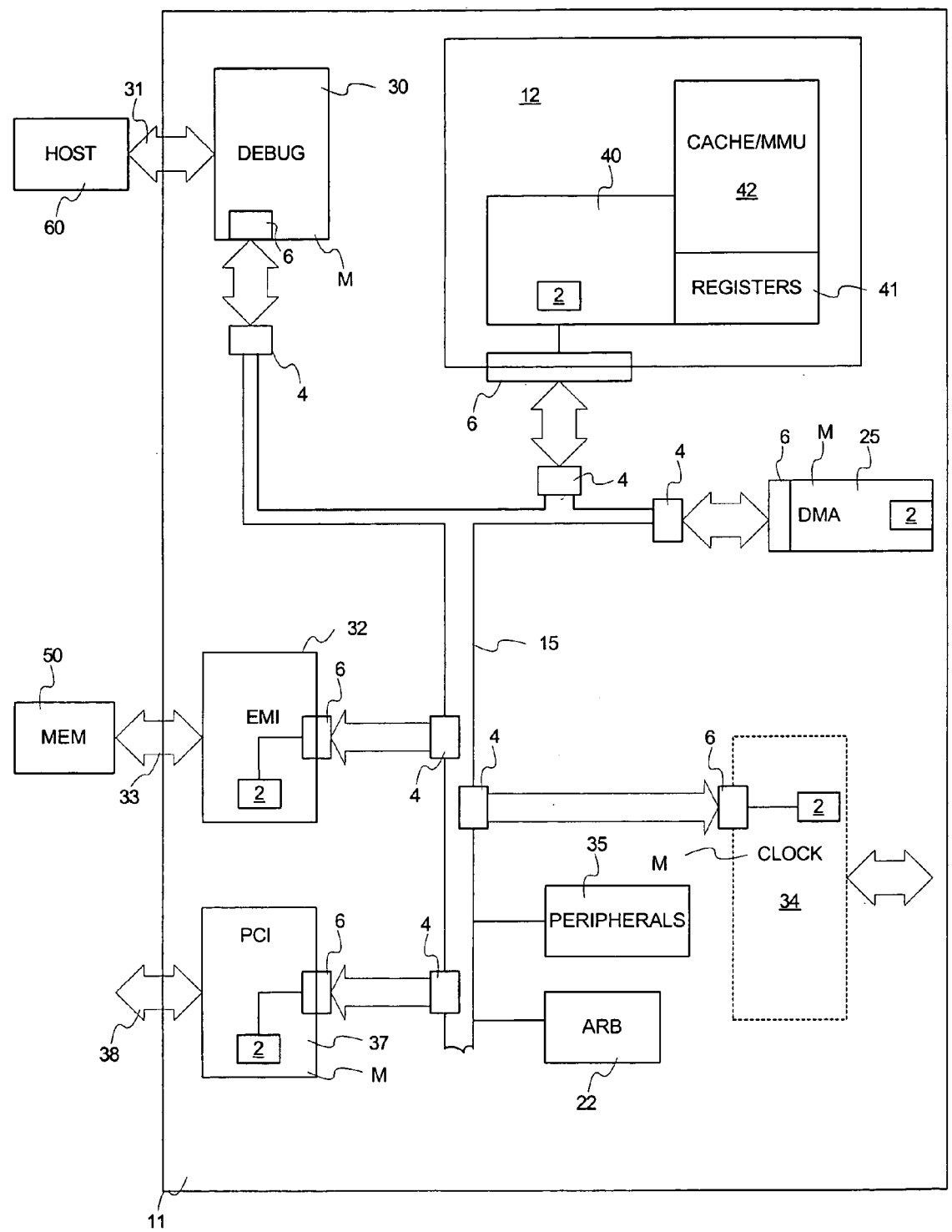
FIG. 1 is a block diagram of an integrated computer system.

FIG. 1 illustrates an integrated circuit according to an embodiment of the invention. On each chip 11 a central processor unit (CPU) 12 is connected to a plurality of modules M by a data and address path 15 arranged to carry bit packets in parallel form. The modules as well as the CPU unit 12 each include packet handling circuitry 2 used in the generation and receipt of bit packets on the path 15. The path 15 is referred to herein as a packet router or routing bus. Two main types of packet are used on the data and address path 15, each including a destination indicator or address to indicate the required destination module connected to the path 15. The packets include request packets which are generated by an initiator module and response packets which are generated by a target module. A module may act as both an initiator and a target. Response packets are of two types, ordinary responses or error responses. These are discussed in more detail later. The modules M as well as the CPU unit 12 each have packet handling circuitry 2 for handling packet formation and receipt of requests, ordinary responses and error responses.

Figure 2:
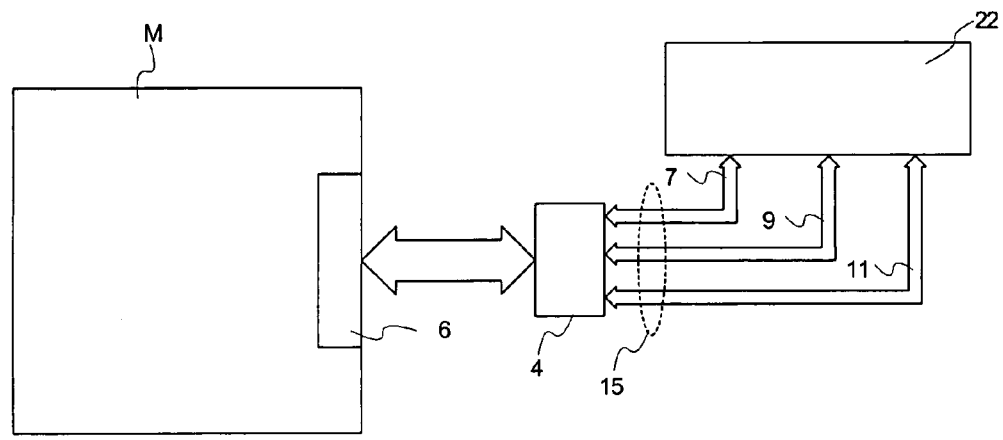
FIG. 2 is a schematic diagram illustrating the connections of a functional module to an arbitration unit.

As shown most clearly in FIG. 2, the routing bus 15 provides bi-directional connections to each module. In this example the bus consists of parallel request and response buses 7, 9 and a dedicated control bus 11 provided respectively for each module so as to link the modules to an arbitration unit 22. Each module is connected to the routing bus via a port 4 and is provided with an interface 6 incorporating a state machine so as to interchange control signals and data between the port 4 and the interface 6.

Figure 3:
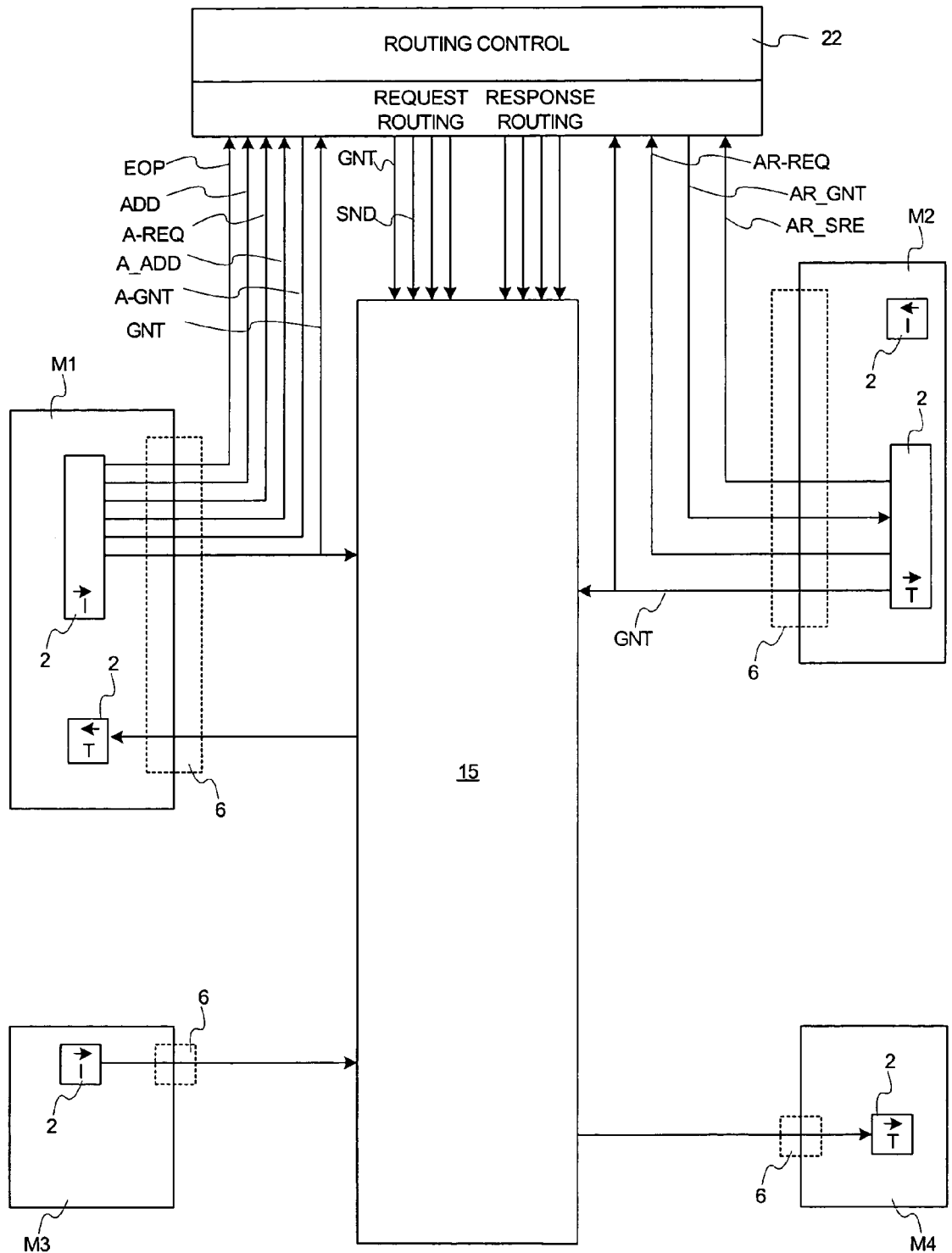
FIG. 3 is a schematic block diagram illustrating the arbitration control signals.

FIG. 3 is a block diagram illustrating relevant functional components of the chip of FIG. 1 to illustrate the concept of targets and initiator modules. It also illustrates the control signals on the control bus 11 for initiator and target modules. The modules are labeled M1, M2, M3 and M4 and may include any of the modules M described with reference to FIG. 1. Modules M1 and M2 both have target and initiator functions as illustrated by the separate target and initiator parts of the interface 6 of each module. Module M3 acts only as an initiator and module M4 acts only as a target. Signals from the interfaces 6 are supplied to central control logic which forms part of the arbitration unit 22. The arbitration unit 22 issues request routing control signals and response routing controls to the routing bus network 15. The arbitration control signals are discussed more fully hereinafter.

In the example shown in FIG. 1, the various modules M include a debug module 30 which includes an external link 31 for transmitting packets across the chip boundary (to, for example, host 60), an external memory interface (EMI) 32 having an external bus connection 33 leading to an external memory 50, clock circuitry 34, various peripheral interfaces 35, a peripheral component interface (PCI) 37 with an external connection 38, a DMA unit 25 for effecting memory accesses as well as the arbitration unit 22. The CPU unit 12 includes a plurality of instruction execution units 40, a plurality of registers 41, and a cache 42. The CPU unit 12 also includes packet handling circuitry 2 connected to the execution units 40. The routing bus 15 is arranged to transmit to the modules M both request and response packets for effecting memory access transactions as discussed further herein. These packets may be generated by software as a result of instruction execution by a CPU or by hardware responsive to detection of a packet. The packets may be generated on-chip and distributed on the bus 15 or generated off-chip and supplied to the on-chip bus 15 through an external connection such as the link 31 associated with the debug module 30.

The CPU 12 can be operated in a conventional manner receiving instructions from a program memory and effecting data read or write operations with the cache 42 on-chip. Additionally external memory accesses for read or write operations may be made through the external memory interface 32 and bus connection 33 to the external memory 50. Each packet is constructed from a series of cells or tokens, the end of the packet being identified by an end of packet (eop) cell. Each packet cell comprises a number of fields which characterize the packet. Each packet is transmitted by a source module and is directed to a destination module. An initiator can issue request packets and act on response packets. A target can receive and act on requests and issue responses. Thus, a source module may be an initiator or a target depending on the nature of the packet. The source module uses its associated port 4 to transmit a packet onto the routing bus 15. The routing bus 15 arranges for the packet to be routed to the port 4 associated with the destination module. The destination module then receives that packet from its associated port. The source and destination modules can be the same.

A transaction is an exchange of packets that allows a module to access the state of another module. A transaction comprises the transfer of a request packet from a source module to a destination module, followed by the transfer of a response packet from that destination module (now acting as a responding module) back to the source module which made the original request. The request packet initiates a transaction and its contents determine the access to be made. The response packet completes the transaction and its contents indicate the result of the access. A response packet also indicates whether the request was valid or not. If the request was valid, a so-called ordinary response packet is sent. If the request was invalid, an error response packet is transmitted. Some modules act only as initiators and thus their packet handling circuitry 2 is capable only of the generation of request packets. Some modules act only as targets (e.g., module M4 in FIG. 3), and therefore their packet handling circuitry 2 is capable only of generating response packets. In that case, both ordinary responses and error responses can be generated. However, some modules are capable of acting both as initiators and as targets (e.g., modules M1 and M2 in FIG. 3), and their packet handling circuitry 2 is capable of generating both request and response type packets.

The format of the multi-bit packets used on the routing bus 15 in the microcomputer are illustrated by way of example in FIGS. 4 and 5. FIG. 4 shows the information carried by each request cell. FIG. 5 shows the information carried by each response cell. This information is conveyed onto the packet router 15 from the interfaces 6 as signals discussed more fully hereinafter.

Any appropriate arbitration algorithm can be used by the arbitration unit 22 to control access to the bus by initiator and target modules. The arbitration unit determines if more than one initiator is requesting access to a routing resource/bus required to access a particular target or group of targets, which port gains access to the target resources. This can be done using a fixed priority size algorithm or a more complex algorithm such as least recently used. The precise algorithm which is used can be determined by a person skilled in the art for the particular implementation. The arbitration decision is made using the following information: initiators requesting a particular target resource, target availability, position in message and the arbitration algorithm which is selected. The arbitration unit also arbitrates for a routing resource to return responses to the initiator based on the following information: the target requesting the resource, initiator availability, location in message and the selected arbitration algorithm.

According to the embodiment of the invention described herein, the arbitration unit 22 is also capable of making an arbitration decision about transfers to be effected after the current transfer. It will be appreciated that, in the absence of the additional signals discussed later with reference to the preferred embodiment of the invention, the arbitration unit would determine a sequence of transfers responding to requests made to it. That is, it would queue requests for arbitration received from various modules attempting to access the bus, effect sequential arbitration decisions and then cause a packet transfer to be implemented following each arbitration decision. The embodiment described herein allows a module to request a deferred arbitration decision while the current transfer is occurring.

Before describing the arbitration mechanism, the control signals of FIG. 3 will be described:

request (req) ready to send data.

This is driven by an initiator module (IM) and is used to indicate that it is ready to transfer a request or element of a request across the interface. If this signal is asserted the request content and framing signals are valid.

Initiators indicate they have data to send by asserting request and expect a grant in this or subsequent cycles to complete the transfer.

grant (gnt) ready to accept data.

This is driven by a target module (TM) and is used by the target to indicate it is ready to accept data. A data or cell transfer across the interface occurs when the initiator is ready to send and the target is ready to accept, i.e. both request and grant are asserted at a rising clock edge.

Targets indicate they are able to accept data by asserting grant and expect a request in this or subsequent cycles to complete the transfer.

end of packet (eop) final cell of packet.

This driven by the initiator and indicates this is the final cell of a request packet.

address (add) the transaction target address.

This holds the address of the location within the target module the operation will occur on. It is field 63 in FIG. 4.

source (src) source identifier.

Identifies the source of the transaction to the system. It allows the system (and target modules) to associate a series of transactions with a specific source of data. It is used as the destination address of a response packet for the associated request.

response request (r_req) indicates a response cell is available.

An initiator should only commence a transfer if it is ready to accept the response packet.

response grant (r_gnt) indicates a response cell may be accepted.

response source (r_src) is a copy of the source identification field which is used as the destination indicator of the response packet.

next request (a_req) indicates the module is ready to start the next or subsequent request packet.

next grant (a_gnt) indicates the system will be ready to accept the next or subsequent request packet on completion of the current packet.

next address (a_add) is the address of the target module for the next or subsequent request, being the dest byte 73 of FIG. 4.

next response request (ar_req) indicates the module is ready to start the next or subsequent response packet.

next response grant (ar_gnt) indicates the system is able to accept the next or subsequent response on completion of the current.

next response source (ar_src) the destination of the next or subsequent response packet, being the SRC byte 99 of FIG. 5.

The latter six signals (a_req, a_gnt, a_add, ar_req, ar_gnt, ar_src) are used to create a path from the module to the arbitration unit 22 which allows information on a later transfer to be dealt with whilst the current transfer is being implemented. Thus, a module can hide the latency associated with the arbitration function by supplying information on the later transfer to be considered whilst the current transfer is being implemented.

Figure 6:
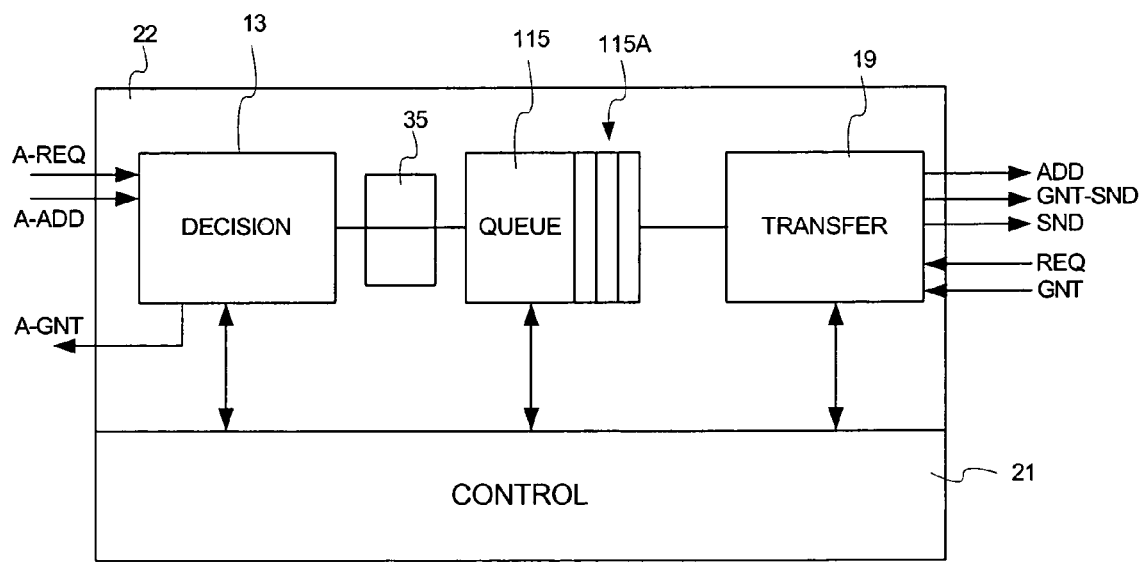
FIG. 6 is a schematic block diagram of the arbitration unit.

FIG. 6 is a block diagram of an arbitration unit 22 and FIGS. 7a and 7b are timing diagrams illustrating an example of such a protocol showing the arbitration function considering the (n+2)th transfer while the nth transfer is occurring.

The arbitration mechanism will now be described with reference to FIGS. 6 and 7. FIG. 6 is a schematic block diagram of the arbitration unit 22. It comprises decision making logic 13, a decision queue 115 having a plurality of decision locations 115a, transfer logic 19 and a control block 21 which controls the functions of the arbitration unit. A flow control mechanism 35 is arranged between the decision making logic 13 and the queue 115. The signals which go into and leave the arbitration unit 22 are also shown schematically in FIG. 6 indicating the block to which they refer. The decision making logic 13 makes arbitration decisions according to any suitable arbitration algorithm as discussed earlier. An arbitration decision is made responsive to receipt of an arbitration request a_req together with the destination byte 73 (a_add) of a packet generated in the functional module which made the arbitration request. Once the arbitration decision has been made, it is placed on a queue 115 in a decision location 115a. The flow control mechanism 35 only allows a decision to be made if there is capacity in the queue. If a decision has been made, a handshake control signal a_gnt is issued indicating that the system is committed to transfer that packet and that a subsequent arbitration request may be received. Each arbitration decision held in the queue 115 identifies the requesting module (src 99), the packet destination (destination byte 73 a_add) and any end of packet (eop) signal. The transfer logic 19 implements a transfer responsive to assertion of the request signal req of the source module and the grant signal gnt of the destination module. This may be needed multiple times depending on the number of cells in the packet and the bus width. The transfer logic 19 implements a transfer by assertion of a grant send signal (gnt_send) sent to the appropriate interface 6 causing the source module to put the packet onto the bus 15. The transfer logic then asserts a send signal (snd) which signals to the receiving module that it should accept the transfer currently on the bus. The packet transfer concludes when a cell with the eop signal asserted is present.

While the transfer logic 19 is implementing a transfer, an arbitration decision can be effected by the decision logic 13 for a later packet. Thus, from the module's point of view, it can request the transfer of a packet by assertion of the request signal req and simultaneously or a number of cycles later request arbitration for a subsequent packet ready for transfer. From the point of view of the arbitration unit 22, it can deal with a transfer request and a request for an arbitration decision in each cycle, and in fact can make a number of sequential arbitration decisions which will be held in the queue 115 while the transfer is being effected. It is possible that a transfer of a packet for which an arbitration decision has been made will involve the assertion in multiple cycles of the request and grant signals, depending on the number of cells in the packet and the bus width.

Once a packet has been transferred, the decision relating to that packet is removed or retired from the queue. The queue additionally includes a mechanism to allow response packets to overtake request packets to avoid deadlock conditions where initiator modules cannot complete transactions because they are still awaiting return of a response packet.

FIG. 7a illustrates the effective transfer of packets from a destination to a source module across the routing bus 15. The request signal req indicates that a function module has requested a transfer, and the grant signal gnt indicates that the destination module is able to receive the transfer. The address signal 63 (add) indicates the location within the target module to which the packet is addressed. That is, it is the part of the address illustrated in FIG. 4 which identifies the destination location within the target module. The destination of the target module itself, indicated by the destination (dest) byte 73 forms the signal a_add in FIG. 7b. FIG. 7b also illustrates the arbitration request signal a_req indicating that a request for arbitration has been made by a functional module. The arbitration grant signal a_gnt is asserted by the arbitration unit 22 when each arbitration decision has been made. At time t0, an arbitration request a_req is made by a functional module and the destination byte 73 a_add of the address is supplied with the arbitration request. When the arbitration decision has been made at time t1, the arbitration grant signal a_gnt is asserted which acts as a handshake control to the functional module which issued the arbitration request to indicate that an arbitration decision has been made and that its packet is ready for transfer. The time between t0 and t1 is a decision cycle time. Once the decision has been made, it is queued in the queue 115 ready to be implemented as a transfer. In order to implement the transfer, the functional module raises the request signal req and supplies the destination byte 73 (add). When the grant signal gnt of the destination module is asserted at time t3 the transfer can be implemented. During that transfer, the decision logic 13 has not been idle. A subsequent destination address for a second packet REQ2 was supplied by the functional module at time t4 while asserting the arbitration request a_req. The arbitration decision was made one decision cycle later and the arbitration grant signal asserted at time t5. That arbitration decision was placed in the queue whilst the transfer logic 19 was implementing the transfer of the first request REQ1. A subsequent request, REQ3 was also the subject of an arbitration decision during the transfer time of the first request REQ1. That decision is also placed on the queue 15. By the time the arbitration decision for the third request has been implemented, the transfer mechanism is ready to transfer a subsequent packet. Thus, at time t6 there are two decisions in the queue, REQ2, REQ3. REQ1 has been transferred and REQ2 is awaiting transfer from the queue. When the request signal req is next asserted by a functional module, at time t6 and the subsequent grant signal from the destination module is asserted, then the transfer of the second request REQ2 can take place. This can coincide with the making of a subsequent arbitration decision for a fourth request, REQ4. Thus, the latency of arbitration decisions can be hidden by overlapping with the transfer time.

It will be appreciated that a transfer may involve multiple assertions of the request signal req until a transfer with eop asserted is made. However, it is only necessary to make a single arbitration decision per packet.

Although the sequence has been described for module M1 as though it is an initiator module making a request to transmit a request packet, a similar sequence of events takes place for the transmission of response packets. This involves the insertion of a response request signal r_req, together with transmission of the src byte indicating the destination of the response packet (being the initiator module). A response grant signal r_gnt is asserted by the initiator module when it is ready to receive a response. These signals are all omitted from FIG. 3 for the sake of clarity, but it will be understood that they extend from the target module interface to the arbitration unit 22.

What is claimed is:

1. A computing system comprising:
   a packet transmission network;
   a plurality of modules coupled to the packet transmission network, each functional module having packet handling circuitry for generating and receiving packets conveyed by the packet transmission network; and
   a routing control mechanism for controlling the flow of packets on the packet transmission network, the routing control mechanism being connected to the packet transmission network, wherein each module generates to the routing control mechanism a transfer request to request transfer of a current packet and an arbitration request requesting a routing decision for a later packet, and wherein each module makes the arbitration request simultaneously with the transfer request for the current packet.

2. The computing system of claim 1 wherein the arbitration request includes a destination indicator for the later packet.

3. The computing system of claim 1 wherein the routing control mechanism accepts the arbitration request and makes a routing decision relating to the arbitration request while implementing the transfer of the current packet requested by the transfer request.

4. The computer system of claim 1, wherein the arbitration request relates to a packet generated after the current packet by the same module as generated the current packet.

5. The computer system of claim 1, wherein at least one of the plurality of modules acts as an initiator modules for generating request packets for implementing transactions, each request packet including the destination indicator.

6. The computer system of claim 1, wherein at least one of the plurality of modules acts as a target modules for receiving the request packets and for issuing response packets in response to the request packets.

7. The computer system of claim 1, wherein the routing control mechanism issues an arbitration grant signal indicating that it has committed an arbitration decision in response to an arbitration request.

8. A method for connecting to a packet transmission network using a device having packet handling circuitry for generating and receiving packets conveyed by the packet transmission network, wherein the device generates packet flow control requests on the packet transmission network, the flow control requests including:
   a transfer request to request transfer of a first packet; and
   an arbitration request with a destination indicator identifying a destination of a second packet, wherein the arbitration request is made prior to completion of transfer of the first packet on the packet transmission network.

9. The method for connection to a packet transmission network of claim 8 wherein the arbitration request is issued when the second packet is ready for transfer.

10. The method for connection to a packet transmission network of claim 8 wherein the arbitration request is issued while a transfer of the first packet requested by the transfer request is occurring.

11. The method for connection to a packet transmission network of claim 8 wherein the device receives a handshake control signal from the packet transmission network indicating that the packet transmission network is committed to transfer the second packet.

12. The method for connection to a packet transmission network of claim 11 wherein the device responds to the handshake control signal by making a subsequent arbitration request for a third packet.

13. A packet routing mechanism for routing packets between a source device and a destination device that are interconnected via a packet transmission network, the routing mechanism comprising:
   an arbitration mechanism coupled to the packet transmission network to receive requests from the source device and route decisions for each packet for which a request is received;
   a decision queue for storing at least one decision which has been made by the arbitration mechanism; and
   a flow control mechanism coupled to the arbitration mechanism and the decision queue and wherein the flow control mechanism issues a handshake control to the source device in response to the request indicating that a routing decision has been made; and
   a transfer mechanism coupled to the packet transmission network for implementing a packet transfer according to a stored routing decision, wherein the arbitration mechanism is configured to make an routing decision for a later packet while a current packet is being transferred by the transfer mechanism.

14. The packet routing mechanism of claim 13 wherein the arbitration decisions is made based in part on availability of a target device.

15. The packet routing mechanism of claim 13 wherein the transfer mechanism implements a packet transfer by asserting a grant send to the source device and a send to the target device.

16. The packet routing mechanism of claim 13 wherein the handshake control comprises a net grant signal indicating the packet routing network will be ready to accept the later packet on completion of the transfer of the current packet.

17. A method for making pipelined routing decisions in a computer system comprising:
   providing a plurality of source devices and destination devices interconnected via a packet transmission network;
   generating a transfer request for a current packet with a source device;
   generating an arbitration request for a later packet; and
   effecting a transfer of the current packet based on an earlier routing decision while making a routing decision in relation to the later packet, wherein the arbitration request is made a number of cycles later from the transfer request during the effecting of the transfer of the current packet.

18. The method of claim 17, wherein the arbitration request relates to a packet to be transferred after the current packet.

19. The method of claim 17 further comprising:
   acknowledging the arbitration request by an arbitration grant control signal.

20. The method of claim 17 further comprising:
   causing a target device to indicate that it is in a state to accept a packet by asserting a grant signal.

* * * * *